United States Patent
Tanabe et al.

(10) Patent No.: US 11,424,078 B2
(45) Date of Patent: Aug. 23, 2022

(54) ELECTROLYTIC SOLUTION FOR ELECTROLYTIC CAPACITOR, AND ELECTROLYTIC CAPACITOR

(71) Applicant: SANYO CHEMICAL INDUSTRIES, LTD., Kyoto (JP)

(72) Inventors: Fumiyuki Tanabe, Kyoto (JP); Takahiro Shiba, Kyoto (JP); Kengo Uchihashi, Kyoto (JP)

(73) Assignee: SANYO CHEMICAL INDUSTRIES, LTD., Kyoto (JP)

( * ) Notice: Subject to any disclaimer, the term of this patent is extended or adjusted under 35 U.S.C. 154(b) by 116 days.

(21) Appl. No.: 16/756,114

(22) PCT Filed: Oct. 23, 2018

(86) PCT No.: PCT/JP2018/039392
§ 371 (c)(1),
(2) Date: Apr. 14, 2020

(87) PCT Pub. No.: WO2019/082904
PCT Pub. Date: May 2, 2019

(65) Prior Publication Data
US 2020/0294724 A1    Sep. 17, 2020

(30) Foreign Application Priority Data

Oct. 24, 2017 (JP) .............. JP2017-204842
Mar. 29, 2018 (JP) .............. JP2018-063561

(51) Int. Cl.
*H01G 9/035* (2006.01)
*H01G 9/145* (2006.01)
*C08F 220/34* (2006.01)
*C08F 220/18* (2006.01)

(52) U.S. Cl.
CPC ........... *H01G 9/035* (2013.01); *C08F 220/18* (2013.01); *C08F 220/34* (2013.01); *H01G 9/145* (2013.01)

(58) Field of Classification Search
CPC ........ H09G 9/035; H09G 9/145; H09G 11/60; H09G 11/62; C08F 220/18; C08F 220/34; H01G 9/035; H01G 9/145; H01G 11/60; H01G 11/62
See application file for complete search history.

(56) References Cited

U.S. PATENT DOCUMENTS

| 4,892,944 A | 1/1990 | Mori et al. |
| 2008/0094778 A1 | 4/2008 | Tanizaki et al. |
| 2021/0193394 A1* | 6/2021 | Tanabe .............. H01G 9/145 |

FOREIGN PATENT DOCUMENTS

| CN | 101000826 | 7/2007 |
| CN | 101091229 | 12/2007 |
| CN | 101154507 | 4/2008 |
| CN | 102751095 | 10/2012 |
| CN | 106531443 | 3/2017 |
| CN | 106953056 | 7/2017 |
| JP | S6477110 | 3/1989 |
| JP | H01103821 | 4/1989 |
| JP | H05117330 | 5/1993 |
| JP | 07045482 A * | 2/1995 |
| JP | H0745482 | 2/1995 |
| JP | H07105315 | 11/1995 |
| JP | 2002208311 | 7/2002 |
| JP | 2002208311 A * | 7/2002 |
| JP | 2002280267 | 9/2002 |
| JP | 2003249422 | 9/2003 |
| JP | 2007067448 | 3/2007 |
| WO | 2017138578 | 8/2017 |
| WO | WO-2017138578 A1 * | 8/2017 ............. H01G 9/145 |

OTHER PUBLICATIONS

"International Preliminary Report of Patentability (Form PCT/IB/373) of PCT/JP2018/039392", with English translation thereof, dated May 7, 2020, pp. 1-20.
"Search Report of Europe Counterpart Application", dated Jul. 30, 2021, pp. 1-6.
Office Action of China Counterpart Application, dated Apr. 2, 2021, pp. 1-7.
"International Search Report (Form PCT/ISA/210) of PCT/JP2018/039392", dated Jan. 8, 2019, with English translation thereof, pp. 1-3.
Office Action of China Counterpart Application, dated Sep. 26, 2021, pp. 1-8.
Office Action of Japan Counterpart Application, with English translation thereof, dated Apr. 26, 2022, pp. 1-10.

* cited by examiner

*Primary Examiner* — James C Goloboy
(74) *Attorney, Agent, or Firm* — JCIPRNET

(57) ABSTRACT

An electrolytic solution for an electrolytic capacitor comprising an electrolyte and a solvent, in which the electrolyte contains an anion and a cation, and the anion is an anion having a structure obtained by removing at least one hydrogen ion from a carboxy group from a copolymer having a carboxy group, the copolymer having a carboxy group has a substituent having 5-20 carbon atoms bonded to a carbon atom of a backbone of the copolymer, the copolymer having a carboxy group does not include a hydroxy group or if it does include a hydroxy group, the content of monomers including a hydroxy group in the structural monomers of the copolymer having a carboxy group is less than 60 wt % based on the weight of all monomers constituting the copolymer having a carboxy group, and the copolymer satisfies a specific condition, and the solvent contains ethylene glycol.

9 Claims, No Drawings

ELECTROLYTIC SOLUTION FOR ELECTROLYTIC CAPACITOR, AND ELECTROLYTIC CAPACITOR

CROSS-REFERENCE TO RELATED APPLICATION

This application is a 371 application of an international PCT application serial no. PCT/JP2018/039392, filed on Oct. 23, 2018, which claims the priority benefit of Japan application JP2017-204842, filed on Oct. 24, 2017 and Japan application JP2018-063561, filed on Mar. 29, 2018. The entirety of the abovementioned patent application is hereby incorporated by reference herein and made a part of this specification.

TECHNICAL FIELD

The present invention relates to an electrolytic solution for an electrolytic capacitor and an electrolytic capacitor including the electrolytic solution.

BACKGROUND ART

Electrolytic capacitors are widely used in various electrical and electronic products, and their applications are diverse, such as charge accumulation, noise removal and phase adjustment. In recent years, the range of environments in which electrolytic capacitors operate has become wider, guarantee of high voltage resistance and high temperature operation has been required, and attempts have been made to improve these performances by adding a voltage resistance improving agent, or devising the structure of an electrolyte.

For example, in Patent Literature 1, a technology in which a salt of 1,6-decanedicarboxylic acid is used as an electrolyte and thus an electrolytic solution having excellent high temperature stability is provided is disclosed.

In addition, the method described in Patent Literature 1 has problems in that, although there is a certain improvement in a rate of decrease in the electrical conductivity, an effect thereof is insufficient, and the voltage resistance itself is not high.

CITATION LIST

Patent Literature

[Patent Literature 1]
Japanese Patent Application Laid-Open No. 2007-67448

SUMMARY OF INVENTION

Technical Problem

An objective of the present invention is to provide an electrolytic solution for an electrolytic capacitor having a high voltage resistance, a high initial conductivity, and excellent heat resistance.

Solution to Problem

The inventors conducted studies in order to solve the above problems and thus developed the present invention.

That is, the present invention provides an electrolytic solution for an electrolytic capacitor including an electrolyte and a solvent, in which the electrolyte contains an anion and a cation, and the anion is an anion having a structure obtained by removing at least one hydrogen ion from a carboxy group from a copolymer having a carboxy group, wherein the copolymer having a carboxy group has a substituent having 5 or more and 20 or fewer carbon atoms bonded to a carbon atom of a backbone of the copolymer, the copolymer having a carboxy group does not include a hydroxy group or if it does include a hydroxy group, the content of monomers including a hydroxy group in the structural monomers of the copolymer having a carboxy group is less than 60 wt % based on the weight of all monomers constituting the copolymer having a carboxy group, and the copolymer satisfies the following Condition 1, and the solvent contains ethylene glycol:
(Condition 1)
the electrical conductivity of an ethylene glycol solution containing 10 wt % of an ammonium salt of the copolymer having a carboxy group and ammonia at 30° C. is 0.2 mS/cm or more and 3.0 mS/cm or less.

Advantageous Effects of Invention

When the electrolytic solution for an electrolytic capacitor of the present invention is used, an electrolytic capacitor having a high voltage resistance, a high initial conductivity, and excellent heat resistance can be obtained.

DESCRIPTION OF EMBODIMENTS

An electrolytic solution for an electrolytic capacitor in the present invention includes an electrolyte and a solvent.

The electrolyte contains an anion and a cation, and the anion is an anion having a structure in which at least one hydrogen ion is removed from a carboxy group from a copolymer having a carboxy group.

The copolymer having a carboxy group has a substituent having 5 or more and 20 or fewer carbon atoms bonded to a carbon atom of a backbone of the copolymer.

The copolymer having a carboxy group does not include a hydroxy group, or if it does include a hydroxy group, the content of monomers including a hydroxy group in the structural monomers of the copolymer having a carboxy group is less than 60 wt % based on the weight of all monomers constituting the copolymer having a carboxy group, and the copolymer satisfies the following Condition 1.
(Condition 1)
The electrical conductivity of an ethylene glycol solution containing 10 wt % of an ammonium salt of the copolymer having a carboxy group and ammonia at 30° C. is 0.2 mS/cm or more and 3.0 mS/cm or less.

The electrolytes may be used alone or two or more thereof may be used in combination.

Examples of copolymers having a carboxy group in the present invention include a copolymer including monomers having a carboxy group as structural monomers. Examples of monomers having a carboxy group include (meth)acrylic acid.

Here, in this specification, the expression "(meth)acrylic" refers to "acrylic" and/or "methacryl", the expression "(meth)acrylate" refers to "acrylate" and/or "methacrylate", and the expression "(meth)acryloyloxy" refers to "acryloyloxy" and/or "methacryloyloxy".

In addition, structural monomers of a copolymer having a carboxy group may include monomers other than monomers having a carboxy group.

Preferable examples of monomers other than monomers having a carboxy group include (meth)acrylic acid esters in consideration of solubility in a solvent.

Among the (meth)acrylic acid esters, in consideration of solubility in a solvent, preferable examples thereof include (meth)acrylic acid alkyl ester, (meth)acrylic acid hydroxyalkyl ester, alkylene oxide adducts of (meth)acrylic acid, alkyl ethers of alkylene oxide adducts of (meth)acrylic acid, (meth)acrylic acid esters having a phospho group, and (meth)acrylic acid esters having a sulfo group.

Here, the (meth)acrylic acid esters may be used alone or two or more thereof may be used in combination.

Examples of (meth)acrylic acid alkyl esters include ethyl (meth)acrylate, butyl (meth)acrylate, 2-ethylhexyl (meth)acrylate, dodecyl (meth)acrylate and octadecyl (meth)acrylate.

The alkyl group of the (meth)acrylic acid alkyl ester preferably has 2 to 20 carbon atoms, and more preferably has 4 to 12 carbon atoms. In consideration of the electrical conductivity, 2 or more carbon atoms are preferable, and in consideration of solubility in a solvent, 20 or fewer carbon atoms are preferable.

Examples of (meth)acrylic acid hydroxyalkyl esters include 2-hydroxyethyl (meth)acrylate, 2-hydroxypropyl (meth)acrylate, 3-hydroxypropyl (meth)acrylate, 2-hydroxy-1-methylethyl (meth)acrylate, 2-hydroxybutyl (meth)acrylate, 3-hydroxybutyl (meth)acrylate, 4-hydroxybutyl (meth)acrylate, 2-hydroxy-1-methylpropyl (meth)acrylate, 2-hydroxy-2-methylpropyl (meth)acrylate, 3-hydroxy-1-methylpropyl (meth)acrylate, 3-hydroxy-2-methylpropyl (meth)acrylate, 6-hydroxyhexyl (meth)acrylate, 7-hydroxyheptyl (meth)acrylate, and 8-hydroxyoctyl (meth)acrylate.

Examples of alkylene oxides in the alkylene oxide adducts of (meth)acrylic acid include ethylene oxide, 1,2- or 1,3-propylene oxide, and 1,2-, 1,3-, 1,4- or 2,3-butylene oxide.

The number of moles of alkylene oxide added to 1 mol of (meth)acrylic acid is preferably 2 to 20 mol and more preferably 4 to 10 mol. The number of moles added is preferably 2 mol or more in consideration of solubility in a solvent, and is preferably 20 mol or less in consideration of the electrical conductivity.

Examples of alkyl groups constituting the alkyl ether in the alkyl ether of alkylene oxide adducts of (meth)acrylic acid include a methyl group, an ethyl group, a butyl group, and an octyl group. Among these, in consideration of the electrical conductivity, a methyl group and an ethyl group are preferable.

Examples of (meth)acrylic acid esters having a phospho group include 2-[(meth)acryloyloxy]ethyl phosphate.

Examples of (meth)acrylic acid esters having a sulfo group include 2-sulfoethyl (meth)acrylate.

Among the (meth)acrylic acid esters, in consideration of the electrical conductivity and voltage resistance, more preferable examples include (meth)acrylic acid alkyl ester, (meth)acrylic acid hydroxyalkyl ester, alkylene oxide adducts of (meth)acrylic acid and alkyl ethers of alkylene oxide adducts of (meth)acrylic acid, and particularly preferable examples thereof include (meth)acrylic acid alkyl ester and alkyl ethers of alkylene oxide adducts of (meth)acrylic acid.

Monomers other than the above monomers having a carboxy group and (meth)acrylic acid esters can be used. Specific examples thereof include styrene and its derivatives (sodium styrene sulfonate, α-methylstyrene, etc.), and (meth)acrylamides having 3 to 20 carbon atoms [(meth)acrylamide, N,N-dimethyl(meth)acrylamide, N-isopropylacrylamide, N,N-dibenzyl(meth)acrylamide, etc.].

The copolymer having a carboxy group has a substituent having 5 or more and 20 or fewer carbon atoms bonded to a carbon atom of a backbone of the copolymer.

Regarding monomers having a substituent which becomes a substituent having 5 or more and 20 or fewer carbon atoms bonded to a carbon atom of the backbone of the copolymer during polymerization, among (meth)acrylic acid esters, for example, those in which the alkyl group of a (meth)acrylic acid alkyl ester has 4 to 19 carbon atoms (butyl (meth)acrylate and 2-ethylhexyl acrylate), those in which the alkyl group of a (meth)acrylic acid hydroxyalkyl ester has 4 to 19 carbon atoms (4-hydroxybutyl (meth)acrylate, etc.), those in which the alkylene group of alkylene oxide adducts of (meth)acrylic acid has 4 to 19 carbon atoms in total (polypropylene glycol acrylate, etc.), and those in which the alkyl group and the alkylene group of alkyl ethers of alkylene oxide adducts of (meth)acrylic acid have 4 to 19 carbon atoms in total (2-(2-ethoxyethoxy)ethyl (meth)acrylate, etc.) may be exemplified.

For example, in the case of a copolymer of methacrylic acid and butyl acrylate, a substituent having 5 or more and 20 or fewer carbon atoms bonded to a carbon atom of a backbone of the copolymer is —$COOC_4H_7$.

The copolymer having a carboxy group does not include a hydroxy group, or if it does include a hydroxy group, the content of monomers including a hydroxy group in the structural monomers of the copolymer having a carboxy group is less than 60 wt % based on the weight of all monomers constituting the copolymer having a carboxy group.

The content of the monomers including a hydroxy group is preferably 50 wt % or less, more preferably 30 wt % or less, and particularly preferably 10 wt % or less. When the content of the monomers having a hydroxy group is 60 wt % or more, there is a problem in consideration of the electrical conductivity.

Here, in the present invention, a hydroxy group moiety in the carboxy group of the copolymer having a carboxy group is not included in the content of hydroxy groups.

In consideration of the electrical conductivity, the content of the monomers having a carboxy group is preferably 5 to 99.9 wt %, more preferably 10 to 90 wt %, and particularly preferably 30 to 70 wt % based on the weight of all monomers constituting the copolymer having a carboxy group.

In addition, in consideration of solubility in a solvent, the content of the (meth)acrylic acid ester is preferably 0.1 to 95 wt %, more preferably 10 to 90 wt %, and particularly preferably 30 to 70 wt % based on the weight of all monomers constituting the copolymer having a carboxy group.

In addition, in consideration of the electrical conductivity, the content of the other monomers is preferably 50 wt % or less, more preferably 30 wt % or less, and particularly preferably 10 wt % or less.

In the copolymer having a carboxy group of the present invention, the electrical conductivity of an ethylene glycol solution containing 10 wt % of an ammonium salt of the copolymer having a carboxy group and ammonia at 30° C. is 0.2 mS/cm or more and 3.0 mS/cm or less. The electrical conductivity of the ethylene glycol solution at 30° C. is preferably 0.4 mS/cm or more and 2.8 mS/cm or less, more preferably 0.6 mS/cm or more and 2.5 mS/cm or less, and particularly preferably 0.8 mS/cm or more and 2.0 mS/cm or less. When the electrical conductivity is less than 0.2 mS/cm, there is a problem that ESR of a capacitor is high, and when the electrical conductivity exceeds 3.0 mS/cm, there is a problem that a voltage resistance of a capacitor is low.

Next, a method of measuring an electrical conductivity will be described.

The copolymer having a carboxy group and ammonium carbonate are mixed into ethylene glycol to obtain a desired ethylene glycol solution. In this case, the quantity ratio is determined so that the number of moles of carboxy groups in the copolymer having a carboxy group is the same as the number of moles of ammonia generated from ammonium carbonate. The amount of ethylene glycol is set such that the content of an ammonium salt of a copolymer having a carboxy group and ammonia is 10 wt %.

The electrical conductivity of the ethylene glycol solution at 30° C. is measured using a Conductivity Meter CM-40S [commercially available from DKK-TOA Corporation].

In the electrical conductivity of the electrolytic solution, in the copolymer having a carboxy group, the content of oxygen atoms in the substituent having 5 or more and 20 or fewer carbon atoms is preferably 33 mmol/g or less, more preferably 25 mmol/g or less, and particularly preferably 20 mmol/g or less based on the weight of the substituent having 5 or more and 20 or fewer carbon atoms.

The content of oxygen atoms in the substituent is calculated by the following formula.

Content (mmol/g) of oxygen atoms in the substituent=number of moles of oxygen atoms included in 1 mol of substituent (mmol)/weight (g) of 1 mol of substituent The number average molecular weight (hereinafter abbreviated as Mn in some cases) of the copolymer in the present invention is preferably 300 to 100,000, more preferably 1,000 to 50,000, and particularly preferably 2,000 to 30,000.

The number average molecular weight is preferably 300 or more in consideration of voltage resistance of the electrolytic solution, and is preferably 100,000 or less in consideration of impregnation properties of the electrolytic solution into an element.

Here, the number average molecular weight in the present invention is a value measured according to a gel permeation chromatographic (GPC) method described in examples to be described below.

In order to improve voltage resistance, the glass transition temperature (hereinafter abbreviated as Tg in some cases) of the copolymer having a carboxy group of the present invention is preferably −100 to 100° C., more preferably −50 to 90° C., and particularly preferably −40 to 90° C.

Here, Tg of the present invention can be measured using a method according to "ASTM D3418-82" using a differential scanning calorimeter ["DSC20", "SSC/580", and the like commercially available from Seiko Instruments Inc.].

The copolymer having a carboxy group in the present invention can be produced by polymerizing the structural monomers according to a known method.

For example, a polymer having (meth)acrylic acid as a structural monomer can be produced by polymerizing monomer components containing (meth)acrylic acid according to a known method (the method described in Japanese Patent Application Laid-Open No. H5-117330).

Preferable examples of cations constituting the electrolyte include ammonium and amidinium in consideration of the electrical conductivity.

Ammonium can be used without particular limitation as long as it is ammonium that forms a salt with the above anions.

Examples of ammonium include unsubstituted ammonium, primary ammonium (methylammonium, ethylammonium, propylammonium, isopropylammonium, etc.), secondary ammonium (dimethylammonium, diethylammonium, methylethylammonium, methylpropylammonium, methylisopropylammonium, etc.), tertiary ammonium (trimethylammonium, triethylammonium, dimethylethylammonium, dimethylpropylammonium, dimethylisopropylammonium, etc.) and quaternary ammonium (tetramethylammonium, ethyltrimethylammonium, diethyldimethylammonium, triethylmethylammonium, tetraethylammonium, etc.).

Amidinium can be used without particular limitation as long as it is amidinium that forms a salt with the above anions.

Examples of amidinium include imidazolinium and cations obtained by substituting a hydrogen atom of imidazolinium with an alkyl group (1,2,3,4-tetramethylimidazolinium, 1,3,4-trimethyl-2-ethylimidazolinium, 1,3-dimethyl-2,4-diethylimidazolinium, 1,2-dimethyl-3,4-diethylimidazolinium, etc.), imidazolium and cations obtained by substituting a hydrogen atom of imidazolium with an alkyl group (1,3-dimethylimidazolium, 1,3-diethylimidazolium, 1-ethyl-3-methylimidazolium, 1,2,3-trimethylimidazolium, etc.).

Among ammonium and amidinium, in consideration of voltage resistance, ammonium is preferable, and unsubstituted ammonium, primary ammonium, and secondary ammonium are more preferable.

The electrolyte can be produced by, for example, a method of adding raw materials (for example, ammonia gas) that become cations of an electrolyte to a mixture including the copolymer and a solvent.

The electrolytic solution for an electrolytic capacitor of the present invention may contain an electrolyte composed of carboxylate ions and the ammonium or amidinium in addition to the electrolyte using the copolymer.

The electrolytes composed of carboxylate ions and the ammonium or amidinium may be used alone or two or more thereof may be used in combination.

Examples of carboxylate ions include anions in which a hydrogen atom is removed from a carboxy group of a carboxylic acid such as saturated polycarboxylic acids (oxalic acid, malonic acid, succinic acid, glutaric acid, adipic acid, pimelic acid, suberic acid, azelaic acid, 2-methyl azelaic acid, sebacic acid, 1,5-octanedicarboxylic acid, 4,5-octanedicarboxylic acid, 1,9-nonanedicarboxylic acid, 1,10-decanedicarboxylic acid, 1,6-decanedicarboxylic acid, 5,6-decanedicarboxylic acid, 1,11-undecanedicarboxylic acid, 1,12-dodecanedicarboxylic acid, 1,13-tridecanedicarboxylic acid, 1,14-tetradecanedicarboxylic acid, 1,15-pentadecanedicarboxylic acid, methylmalonic acid, ethylmalonic acid, propylmalonic acid, butylmalonic acid, pentylmalonic acid, hexylmalonic acid, dimethylmalonic acid, diethylmalonic acid, methylpropylmalonic acid, methyl butyl malonic acid, ethyl propyl malonic acid, dipropyl malonic acid, methylsuccinic acid, ethylsuccinic acid, 2,2-dimethylsuccinic acid, 2,3-dimethylsuccinic acid, 2-methylglutaric acid, 3-methylglutaric acid, 3-methyl-3-ethylglutaric acid, 3,3-diethylglutaric acid, 3,3-dimethylglutaric acid, 3-methyl adipic acid, etc.);

saturated monocarboxylic acids (formic acid, acetic acid, propionic acid, butyric acid, isobutyric acid, valeric acid, caproic acid, enanthic acid, caprylic acid, pelargonic acid, lauric acid, myristic acid, stearic acid, behenic acid, undecanoic acid, etc.);

unsaturated monocarboxylic acids [(meth)acrylic acid, crotonic acid, oleic acid, etc.];

unsaturated monocarboxylic acids (maleic acid, fumaric acid, itaconic acid, citraconic acid, etc.);

aromatic monocarboxylic acids (benzoic acid, cinnamic acid, naphthoic acid, toluic acid, ethylbenzoic acid, propylbenzoic acid, isopropylbenzoic acid, butylbenzoic acid, isobutylbenzoic acid, tert-butylbenzoic acid, hydroxybenzoic acid, ethoxybenzoic acid, propoxybenzoic acid, isopropoxybenzoic acid, butoxybenzoic acid, isobutoxybenzoic acid, tert-butoxybenzoic acid, aminobenzoic acid, N-methylaminobenzoic acid, N-ethylaminobenzoic acid, N-propylaminobenzoic acid, N-isopropylaminobenzoic acid, N-butylaminobenzoic acid, N-isobutylaminobenzoic acid, N-tert-butylaminobenzoic acid, N,N-dimethylaminobenzoic acid, N,N-diethylaminobenzoic acid, etc.); and aromatic polycarboxylic acids (phthalic acid, isophthalic acid, terephthalic acid, etc.).

Among these, in consideration of voltage resistance, anions in which a hydrogen ion of a carboxy group is removed from a saturated polycarboxylic acid and an unsaturated polycarboxylic acid are preferable.

The solvent used for the electrolytic solution for an electrolytic capacitor of the present invention is a solvent containing ethylene glycol. Examples of solvents other than ethylene glycol include water, alcohol solvents (methyl alcohol, ethyl alcohol, propyl alcohol, butyl alcohol, propylene glycol, etc.), amide solvents (N-methylformamide, N,N-dimethylformamide, etc.), lactone solvents (α-acetyl-γ-butyrolactone, β-butyrolactone, γ-butyrolactone, γ-valerolactone, δ-valerolactone, etc.), nitrile solvents (acetonitrile, propionitrile, butyronitrile, acrylonitrile, methacrylonitrile, benzonitrile, etc.), sulfoxide solvents (dimethyl sulfoxide, methyl ethyl sulfoxide, and diethyl sulfoxide), and sulfone solvents (sulfolane, ethyl methyl sulfone, etc.).

Among these solvents other than ethylene glycol, in consideration of the electrical conductivity, water, alcohol solvents, lactone solvents, and sulfone solvents are preferable.

The solvents may be used alone or two or more thereof may be used in combination.

Electrolytes other than the electrolyte using the copolymer having a carboxy group can be synthesized using known methods [methods described in J. Am. Chem. Soc., 69, 2269 (1947) and U.S. Pat. No. 4,892,944].

For example, the electrolyte can be synthesized using a method in which a tertiary amine is quaternized with a carbonate and acid exchange is then performed.

Preferably, the electrolytic solution for an electrolytic capacitor of the present invention further contains at least one selected from the group consisting of boric acid, borate ester, boronic acid, and boronic acid ester.

Examples of borate esters include trimethyl borate, triethyl borate, tripropyl borate, tributyl borate, triphenyl borate, 2-ethoxy-4,4,5,5-tetramethyl-1,3,2-dioxaborolane, 2-isopropoxy-4,4,6-trimethyl-1,3,2-dioxaborinane, and 2,4,6-trimethoxyboroxine.

Examples of boronic acids include methyl boronic acid, ethyl boronic acid, propyl boronic acid, butyl boronic acid, cyclohexyl boronic acid, phenyl boronic acid, 1-naphthaleneboronic acid, 2-phenylethylboronic acid, 2-furylboronic acid, and 3-furylboronic acid.

Examples of boronic acid esters include 2,4,4,5,5-pentamethyl-1,3,2-dioxaborolane, 2-ethyl-4,4,5,5-tetramethyl-1,3,2-dioxaborolane, 2-benzyl-4,4,5,5-tetramethyl-1,3,2-dioxaborolane, 2-phenyl-4,4,5,5-tetramethyl-1,3,2-dioxaborolane, and 5,5-dimethyl-2-phenyl-1,3,2-dioxaborinane.

When the electrolytic solution for an electrolytic capacitor of the present invention contains at least one selected from the group consisting of boric acid, borate ester, boronic acid, and boronic acid ester, surprisingly, the electrical conductivity is greatly improved. Although the mechanism is not clear, the following is speculated.

At least one selected from the group consisting of boric acid, borate ester, boronic acid, and boronic acid ester reversibly bonds to the electrolyte using the copolymer having a carboxy group to form a complex, which moves in the electrolytic solution. This causes charge transfer between the copolymers having a carboxy group, and this is thought to increase the electrical conductivity.

A weight proportion of the electrolyte of the present invention is preferably 1 to 40 wt %, more preferably 3 to 30 wt %, and particularly preferably 5 to 20 wt % based on the weight of the electrolytic solution for an electrolytic capacitor.

When the weight proportion is 1 wt % or more, the electrical conductivity is favorable, and when the weight proportion is 40 wt % or less, impregnation properties are favorable.

In consideration of the electrical conductivity, the weight proportion of the solvent of the present invention is preferably 60 to 99 wt %, particularly preferably 70 to 97 wt %, and most preferably 80 to 95 wt % based on the weight of the electrolytic solution for an electrolytic capacitor.

When the electrolytic solution for an electrolytic capacitor of the present invention contains boric acid, borate ester, boronic acid, and boronic acid ester, a proportion of the total weight of boric acid, borate ester, boronic acid, and boronic acid ester is preferably 0.1 to 5 wt %, and more preferably 0.3 to 2 wt % based on the weight of the electrolytic solution for an electrolytic capacitor in consideration of the electrical conductivity.

The electrolytic capacitor of the present invention is not limited in shape, size, and the like as long as it contains the electrolytic solution for an electrolytic capacitor of the present invention. For example, a winding electrolytic capacitor which is a capacitor formed by winding a separator interposed between an anode (aluminum oxide foil) in which aluminum oxide is formed on the anode surface and a cathode aluminum foil may be exemplified.

An aluminum electrolytic capacitor of the present invention can be obtained by impregnating the electrolytic solution for an electrolytic capacitor of the present invention as an electrolytic solution for driving into a separator (Kraft paper, Manila paper, etc.), storing it in a bottomed cylindrical aluminum case together with an anode and a cathode, and then sealing an opening of an aluminum case with sealing rubber (butyl rubber, silicone rubber, etc.).

EXAMPLES

While the present invention will be described below in more detail with reference to examples, the present invention is not limited to these examples.

Mn of polymers in production examples was measured using GPC under the following conditions.

Device: HLC-8120 commercially available from Tosoh Corporation

Column: TSK GEL GMH6 2 columns [commercially available from Tosoh Corporation]

Measurement temperature: 40° C.

Sample solution: 0.25 wt % THF solution

Solution injection amount: 100 μl

Detection device: refractive index detector

Reference material: standard polystyrene (TSKstandard POLYSTYRENE) commercially available from Tosoh Corporation, 12 points (weight average molecular weight: 500 1050 2800 5970 9100 18100 37900 96400 190000 355000 1090000 2890000)

In addition, Tg of polymers in production examples was measured according to a method according to "ASTM D3418-82" using a differential scanning calorimeter ["DSC20", "SSC/580", etc. commercially available from Seiko Instruments Inc.].

<Synthesis of Copolymers>

Production Example 1

Synthesis of Copolymer (A-1)

70 parts by weight of methyl isobutyl ketone [commercially available from Wako Pure Chemical Industries, Ltd.], 3.0 parts by weight of acrylic acid [commercially available from Nippon Shokubai Co., Ltd.], and 27.0 parts by weight of butyl acrylate [commercially available from Nippon Shokubai Co., Ltd.] were put into a flask including a stirrer, a thermometer and a cooling pipe, and heated to 80° C. A solution obtained by dissolving 0.5 parts by weight of azobisisobutyronitrile [commercially available from Wako Pure Chemical Industries, Ltd.] prepared in advance in 5 parts by weight of methyl isobutyl ketone was added dropwise thereto over 3 hours. After dropwise addition was completed, heating was additionally performed for 3 hours. Then, methyl isobutyl ketone and water were removed by distillation according to drying under a reduced pressure under conditions of 100° C. and 0.5 kPa, and thereby Copolymer (A-1) was obtained.

The number average molecular weight of Copolymer (A-1) was 6,300 and Tg was −39° C.

Production Example 2

Synthesis of Copolymer (A-2)

Copolymer (A-2) was obtained in the same manner as in Production Example 1 except that, in Production Example 1, the weight of acrylic acid prepared was changed from 3.0 parts by weight to 9.0 parts by weight, and the weight of butyl acrylate prepared was changed from 27.0 parts by weight to 21.0 parts by weight.

The number average molecular weight of Copolymer (A-2) was 7,200, and Tg was −7° C.

Production Example 3

Synthesis of Copolymer (A-3)

Copolymer (A-3) was obtained in the same manner as in Production Example 1 except that, in Production Example 1, the weight of acrylic acid prepared was changed from 3.0 parts by weight to 15.0 parts by weight, and the weight of butyl acrylate prepared was changed from 27.0 parts by weight to 15.0 parts by weight.

The number average molecular weight of Copolymer (A-3) was 6,500, and Tg was 26° C.

Production Example 4

Synthesis of Copolymer (A-4)

Copolymer (A-4) was obtained in the same manner as in Production Example 1 except that, in Production Example 1, the weight of acrylic acid prepared was changed from 3.0 parts by weight to 21.0 parts by weight, and the weight of butyl acrylate prepared was changed from 27.0 parts by weight to 9.0 parts by weight.

The number average molecular weight of Copolymer (A-4) was 6,000, and Tg was 58° C.

Production Example 5

Synthesis of Copolymer (A-5)

Copolymer (A-5) was obtained in the same manner as in Production Example 1 except that, in Production Example 1, the weight of acrylic acid prepared was changed from 3.0 parts by weight to 27.0 parts by weight, and the weight of butyl acrylate prepared was changed from 27.0 parts by weight to 3.0 parts by weight.

The number average molecular weight of Copolymer (A-5) was 6,300, and Tg was 90° C.

Production Example 6

Synthesis of Copolymer (A-6)

Copolymer (A-6) was obtained in the same manner as in Production Example 1 except that, in Production Example 1, the weight of acrylic acid prepared was changed from 3.0 parts by weight to 27.0 parts by weight, the weight of butyl acrylate prepared was changed from 27.0 parts by weight to 3.0 parts by weight, and the weight of azobisisobutyronitrile prepared was changed from 0.5 parts by weight to 2 parts by weight.

The number average molecular weight of Copolymer (A-6) was 2,500, and Tg was 90° C.

Production Example 7

Synthesis of Copolymer (A-7)

Copolymer (A-7) was obtained in the same manner as in Production Example 1 except that, in Production Example 1, the weight of acrylic acid prepared was changed from 3.0 parts by weight to 15.0 parts by weight, and 27.0 parts by weight of butyl acrylate was changed to 15.0 parts by weight of 2-ethylhexyl acrylate.

The number average molecular weight of Copolymer (A-7) was 7,000, and Tg was 18° C.

Production Example 8

Synthesis of Copolymer (A-8)

Copolymer (A-8) was obtained in the same manner as in Production Example 1 except that, in Production Example 1, 3.0 parts by weight of acrylic acid was changed to 15.0 parts by weight of methacrylic acid, and 27.0 parts by weight of butyl acrylate was changed to 15.0 parts by weight of butyl methacrylate.

The number average molecular weight of Copolymer (A-8) was 5,400, and Tg was 90° C.

Production Example 9

Synthesis of Copolymer (A-9)

Copolymer (A-9) was obtained in the same manner as in Production Example 3 except that, in Production Example 3, the weight of methyl isobutyl ketone prepared was changed from 70 parts by weight to 210 parts by weight.
The number average molecular weight of Copolymer (A-9) was 1,500, and Tg was 26° C.

Production Example 10

Synthesis of Copolymer (A-10)

Copolymer (A-10) was obtained in the same manner as in Production Example 3 except that, in Production Example 3, the weight of methyl isobutyl ketone prepared was changed from 70 parts by weight to 30 parts by weight.
The number average molecular weight of Copolymer (A-10) was 30,500, and Tg was 26° C.

Production Example 11

Synthesis of Copolymer (A-11)

Copolymer (A-11) was obtained in the same manner as in Production Example 3 except that, in Production Example 3, 15.0 parts by weight of butyl acrylate was changed to 15.0 parts by weight of 4-hydroxybutyl acrylate.
The number average molecular weight of Copolymer (A-11) was 5,000, and Tg was 20° C.

Production Example 12

Synthesis of Copolymer (A-12)

Copolymer (A-12) was obtained in the same manner as in Production Example 3 except that, in Production Example 3, 15.0 parts by weight of butyl acrylate was changed to 15.0 parts by weight of 2-(2-ethoxyethoxy)ethyl acrylate [product name "Light acrylate EC-A", commercially available from Kyoeisha Chemical Co., Ltd.].
The number average molecular weight of Copolymer (A-12) was 7,200, and Tg was 18° C.

Production Example 13

Synthesis of Copolymer (A-13)

Copolymer (A-13) was obtained in the same manner as in Production Example 3 except that, in Production Example 3, 15.0 parts by weight of butyl acrylate was changed to 15.0 parts by weight of polypropylene glycol acrylate [product name "BLEMMER AP-400", commercially available from NOF Corporation].
The number average molecular weight of Copolymer (A-13) was 6,800, and Tg was 24° C.

Production Example 14

Synthesis of Copolymer (A-14)

Copolymer (A-14) was obtained in the same manner as in Production Example 1 except that, in Production Example 1, 27.0 parts by weight of butyl acrylate was changed to 27.0 parts by weight of 4-hydroxybutyl acrylate.
The number average molecular weight of Copolymer (A-14) was 6,000, and Tg was 20° C.

Production Example 15

Synthesis of Copolymer (A-15)

Copolymer (A-15) was obtained in the same manner as in Production Example 2 except that, in Production Example 2, 21.0 parts by weight of butyl acrylate was changed to 21.0 parts by weight of 4-hydroxybutyl acrylate.
The number average molecular weight of Copolymer (A-15) was 6,000, and Tg was 30° C.

Production Example 16

Synthesis of Copolymer (A-16)

Copolymer (A-16) was obtained in the same manner as in Production Example 3 except that, in Production Example 3, 15.0 parts by weight of butyl acrylate was changed to 15.0 parts by weight of methoxypolyethylene glycol acrylate [product name "NK Ester AM-130G", commercially available from Shin-Nakamura Chemical Co., Ltd.].
The number average molecular weight of Copolymer (A-16) was 7,000, and Tg was 10° C.

Production Example 17

Synthesis of Copolymer (A-17)

Copolymer (A-17) was obtained in the same manner as in Production Example 3 except that, in Production Example 3, 15.0 parts by weight of butyl acrylate was changed to 15.0 parts by weight of ethyl acrylate.
The number average molecular weight of Copolymer (A-17) was 5,800, and Tg was 40° C.

Production Example 18

Synthesis of Copolymer (A-18)

Copolymer (A-18) was obtained in the same manner as in Production Example 3 except that, in Production Example 3, 15.0 parts by weight of butyl acrylate was changed to 15.0 parts by weight of docosyl acrylate.
The number average molecular weight of Copolymer (A-18) was 7,200, and Tg was 85° C.

The compositions, and Mn and Tg of Copolymers (A-1) to (A-18) obtained in Production Examples 1 to 18 are summarized in Table 1.

TABLE 1

| | | Copolymer having carboxy group | (Meth)acrylic acid | Monomer component | | Content of (meth)acrylic acid ester (mass %) | Number of carbon atoms of substituent bonded to backbone of copolymer |
| | | | | Content of (meth)acrylic acid (mass %) | Monomer having substituent | | |
|---|---|---|---|---|---|---|---|
| Production Example | 1 | (A-1) | Acrylic acid | 10 | Butyl acrylate | 90 | 5 |
| | 2 | (A-2) | Acrylic acid | 30 | Butyl acrylate | 70 | 5 |
| | 3 | (A-3) | Acrylic acid | 50 | Butyl acrylate | 50 | 5 |

TABLE 1-continued

| | | | | | |
|---|---|---|---|---|---|
| 4 (A-4) | Acrylic acid | 70 | Butyl acrylate | 30 | 5 |
| 5 (A-5) | Acrylic acid | 90 | Butyl acrylate | 10 | 5 |
| 6 (A-6) | Acrylic acid | 90 | Butyl acrylate | 10 | 5 |
| 7 (A-7) | Acrylic acid | 50 | 2-Ethylhexyl acrylate | 50 | 9 |
| 8 (A-8) | Methacrylic acid | 50 | Butyl methacrylate | 50 | 5 |
| 9 (A-9) | Acrylic acid | 50 | Butyl acrylate | 50 | 5 |
| 10 (A-10) | Acrylic acid | 50 | Butyl acrylate | 50 | 5 |
| 11 (A-11) | Acrylic acid | 50 | 4-Hydroxybutyl acrylate | 50 | 5 |
| 12 (A-12) | Acrylic acid | 50 | 2-(2-Ethoxyethoxy)ethyl acrylate | 50 | 7 |
| 13 (A-13) | Acrylic acid | 50 | Polypropylene glycol acrylate (n = 6) | 50 | 19 |
| 14 (A-14) | Acrylic acid | 10 | 4-Hydroxybutyl acrylate | 90 | 5 |
| 15 (A-15) | Acrylic acid | 30 | 4-Hydroxybutyl acrylate | 70 | 5 |
| 16 (A-16) | Acrylic acid | 50 | Methoxypolyethylene glycol acrylate (n = 13) | 50 | 28 |
| 17 (A-17) | Acrylic acid | 50 | Ethyl acrylate. | 50 | 3 |
| 18 (A-18) | Acrylic acid | 50 | Docosyl acrylate | 50 | 23 |

| | | Content of monomers including hydroxy group (mass %) | Electrical conductivity of ethylene glycol solution containing 10 wt % of ammonium salt of copolymer and ammonia (mS/cm) | Content of oxygen atoms in substituent (mmol/g) | Mn | Tg (° C.) |
|---|---|---|---|---|---|---|
| Production Example | 1 | 0 | 0.83 | 19.8 | 6,300 | −39 |
| | 2 | 0 | 1.02 | 19.8 | 7,200 | −7 |
| | 3 | 0 | 1.43 | 19.8 | 6,500 | 26 |
| | 4 | 0 | 1.62 | 19.8 | 6,000 | 58 |
| | 5 | 0 | 1.85 | 19.8 | 6,300 | 90 |
| | 6 | 0 | 2.5 | 19.8 | 2,500 | 90 |
| | 7 | 0 | 1.5 | 12.7 | 7,000 | 18 |
| | 8 | 0 | 1.35 | 19.8 | 5,400 | 90 |
| | 9 | 0 | 1.65 | 19.8 | 1,500 | 26 |
| | 10 | 0 | 1.25 | 19.8 | 30,500 | 26 |
| | 11 | 50 | 1.2 | 25.6 | 5,000 | 20 |
| | 12 | 0 | 1.32 | 15.5 | 7,200 | 18 |
| | 13 | 50 | 1.1 | 24 | 6,800 | 24 |
| | 14 | 90 | 0.2 | 24.8 | 6,000 | 20 |
| | 15 | 70 | 0.4 | 24.8 | 6,000 | 30 |
| | 16 | 0 | 0.1 | 23.8 | 7,000 | 10 |
| | 17 | 0 | 0.8 | 33.7 | 5,800 | 40 |
| | 18 | 0 | insoluble | 5.7 | 7,200 | 85 |

<Preparation of Electrolytic Solution for an Electrolytic Capacitor>

Example 1

10 parts by weight of Copolymer (A-1) synthesized in Production Example 1 was dissolved in a solvent in which 87 parts by weight of ethylene glycol and 3 parts by weight of water were mixed. Next, ammonia gas was continuously blown into the mixed solvent at a rate of 1 ml/sec.

During blowing of ammonia gas, measurement of pH of the mixed solvent continued, and blowing was terminated when a difference between the maximum value and the minimum value of pH for 1 minute was 0.1 or less.

Thereby, an electrolytic solution for an electrolytic capacitor (B-1) containing an electrolyte composed of an anion and a cation shown in Table 2 was prepared.

Examples 2 to 13

Electrolytic solutions for an electrolytic capacitor (B-2) to (B-13) containing an electrolyte composed of an anion and a cation shown in Table 2 were prepared in the same manner as in Example 1 except that Copolymers (A-2) to (A-13) were used in place of Copolymer (A-1) in Example 1.

Example 14

10 parts by weight of Copolymer (A-3) synthesized in Production Example 3 was dissolved in a solvent in which 87 parts by weight of ethylene glycol and 3 parts by weight of water were mixed. Next, dimethylamine gas was continuously blown into the mixed solvent at a rate of 1 ml/sec.

During blowing of dimethylamine gas, measurement of pH of the mixed solvent continued, and blowing was terminated when a difference between the maximum value and the minimum value of pH for 1 minute was 0.1 or less.

Thereby, an electrolytic solution for an electrolytic capacitor (B-14) containing an electrolyte composed of an anion and a cation shown in Table 2 was prepared.

Example 15

6.0 parts by weight of 2,4-dimethylimidazoline [commercially available from Tokyo Chemical Industry Co., Ltd.] was added dropwise to a solution in which 12.0 parts by weight of dimethyl carbonate [commercially available from Tokyo Chemical Industry Co., Ltd.] and 3.0 parts by weight of methanol [commercially available from Wako Pure Chemical Industries, Ltd.] were mixed, and the mixture was stirred at 120° C. for 15 hours to obtain a 76 wt % methanol solution of 1,2,3,4-tetramethylimidazolinium/methyl carbonate salt. 10 parts by weight of Copolymer (A-1) synthesized in Production Example 1 was added thereto, the pressure was reduced for 3 hours under conditions of 50° C. and 1.0 kPa, and the temperature was then increased to 100° C., the pressure was additionally reduced for 3 hours, and the residual solvent was distilled off to obtain an electrolyte (Copolymer (A-1) 1,2,3,4-tetramethylimidazolinium).

87 parts by weight of ethylene glycol and 3 parts by weight of water were added thereto, and the mixture was uniformly stirred.

Thereby, an electrolytic solution for an electrolytic capacitor (B-15) containing an electrolyte composed of an anion and a cation shown in Table 2 was prepared.

Example 16

10 parts by weight of Copolymer (A-1) synthesized in Production Example 1 was dissolved in a solvent in which 86 parts by weight of ethylene glycol and 3 parts by weight of water were mixed. Next, ammonia gas was continuously blown into the mixed solvent at a rate of 1 ml/sec.

During blowing of ammonia gas, measurement of pH of the mixed solvent continued, and blowing was terminated when a difference between the maximum value and the minimum value of pH for 1 minute was 0.1 or less.

Next, 1 part by weight of boric acid was added to and dissolved in the mixed solvent, and thereby an electrolytic solution for an electrolytic capacitor (B-16) containing an electrolyte composed of an anion and a cation shown in Table 2 was prepared.

Example 17

An electrolytic solution for an electrolytic capacitor (B-17) containing an electrolyte composed of an anion and a cation shown in Table 2 was prepared in the same manner as in Example 16 except that 1 part by weight of triethyl borate was used in place of 1 part by weight of boric acid in Example 16.

Example 18

An electrolytic solution for an electrolytic capacitor (B-18) containing an electrolyte composed of an anion and a cation shown in Table 2 was prepared in the same manner as in Example 16 except that 1 part by weight of ethylboronic acid was used in place of 1 part by weight of boric acid in Example 16.

Comparative Example 1

5 parts by weight of 1,6-dodecanedioic acid [commercially available from Ube Industries, Ltd.] was dissolved in a solvent in which 87 parts by weight of ethylene glycol and 3 parts by weight of water were mixed. Next, ammonia gas was continuously blown into the mixed solvent at a rate of 1 ml/sec.

During blowing of ammonia gas, measurement of pH of the mixed solvent continued, and blowing was terminated when a difference between the maximum value and the minimum value of pH for 1 minute was 0.1 or less.

Thereby, a comparative electrolytic solution for an electrolytic capacitor (B'-1) containing an electrolyte composed of an anion and a cation shown in Table 2 was prepared.

Comparative Examples 2 to 6

Electrolytic solutions for an electrolytic capacitor (B'-2) to (B'-6) containing an electrolyte composed of an anion and a cation shown in Table 2 were prepared in the same manner as in Example 1 except that Copolymers (A-14) to (A-18) were used in place of Copolymer (A-1) in Example 1.

The "voltage resistance" and "heat resistance" of the electrolytic solutions for an electrolytic capacitor obtained in the examples and comparative examples were evaluated according to the following methods. The results are shown in Table 2.

TABLE 2

| | | Electrolytic solution for electrolytic capacitor | Components of electrolytic solution | | | Physical properties | |
| --- | --- | --- | --- | --- | --- | --- | --- |
| | | | Anion | Cation | Additive | The number of carbon atoms of substituent bonded to backbone of copolymer | Content of monomers including hydroxy group (mass %) |
| Example | 1 | (B-1) | Anion having structure in which hydrogen ion of carboxy group is removed from (A-1) | Ammonium | — | 5 | 0 |
| | 2 | (B-2) | Anion having structure in which hydrogen ion of carboxy group is removed from (A-2) | Ammonium | — | 5 | 0 |
| | 3 | (B-3) | Anion having structure in which hydrogen ion of carboxy group is removed from (A-3) | Ammonium | — | 5 | 0 |

TABLE 2-continued

|  |  |  | Anion | Cation | Additive | | |
|---|---|---|---|---|---|---|---|
|  | 4 | (B-4) | Anion having structure in which hydrogen ion of carboxy group is removed from (A-4) | Ammonium | — | 5 | 0 |
|  | 5 | (B-5) | Anion having structure in which hydrogen ion of carboxy group is removed from (A-5) | Ammonium | — | 5 | 0 |
|  | 6 | (B-6) | Anion having structure in which hydrogen ion of carboxy group is removed from (A-6) | Ammonium | — | 5 | 0 |
|  | 7 | (B-7) | Anion having structure in which hydrogen ion of carboxy group is removed from (A-7) | Ammonium | — | 9 | 0 |
|  | 8 | (B-8) | Anion having structure in which hydrogen ion of carboxy group is removed from (A-8) | Ammonium | — | 5 | 0 |
|  | 9 | (B-9) | Anion having structure in which hydrogen ion of carboxy group is removed from (A-9) | Ammonium | — | 5 | 0 |
|  | 10 | (B-10) | Anion having structure in which hydrogen ion of carboxy group is removed from (A-10) | Ammonium | — | 5 | 0 |
|  | 11 | (B-11) | Anion having structure in which hydrogen ion of carboxy group is removed from (A-11) | Ammonium | — | 5 | 50 |
|  | 12 | (B-12) | Anion having structure in which hydrogen ion of carboxy group is removed from (A-12) | Ammonium | — | 7 | 0 |
|  | 13 | (B-13) | Anion having structure in which hydrogen ion of carboxy group is removed from (A-13) | Ammonium | — | 19 | 50 |
|  | 14 | (B-14) | Anion having structure in which hydrogen ion of carboxy group is removed from (A-3) | Dimethylammonium | — | 5 | 0 |
|  | 15 | (B-15) | Anion having structure in which hydrogen ion of carboxy group is removed from (A-3) | Tetra-methylamidinium | | 5 | 0 |
|  | 16 | (B-16) | Anion having structure in which hydrogen ion of carboxy group is removed from (A-1) | Ammonium | Boric acid | 5 | 0 |
|  | 17 | (B-17) | Anion having structure in which hydrogen ion of carboxy group is removed from (A-1) | Ammonium | Triethyl borate | 5 | 0 |
|  | 18 | (B-18) | Anion having structure in which hydrogen ion of carboxy group is removed from (A-1) | Ammonium | Ethyl boronic acid | 5 | 0 |
| Comparative Example | 1 | (B'-1) | Anion having structure in which hydrogen ion of carboxy group is removed from 1,6-dodecanedioic acid | Ammonium | — | — | — |
|  | 2 | (B'-2) | Anion having structure in which hydrogen ion of carboxy group is removed from (A-14) | Ammonium | — | 5 | 90 |
|  | 3 | (B'-3) | Anion having structure in which hydrogen ion of carboxy group is removed from (A-15) | Ammonium | — | 5 | 70 |
|  | 4 | (B'-4) | Anion having structure in which hydrogen ion of carboxy group is removed from (A-16) | Ammonium | — | 28 | 0 |

TABLE 2-continued

| | | | | | | |
|---|---|---|---|---|---|---|
| 5 | (B'-5) | Anion having structure in which hydrogen ion of carboxy group is removed from (A-17) | Ammonium | — | 3 | 0 |
| 6 | (B'-6) | Anion having structure in which hydrogen ion of carboxy group is removed from (A-18) | Ammonium | — | 23 | 0 |

Physical properties

| | | [Condition 1] electrical conductivity of ethylene glycol solution containing 10 wt % of ammonium salt of copolymer and ammonia (mS/cm) | Content of oxygen atoms in substituent (mmol/g) | Sparking voltage (V) | Initial electrical conductivity (mS/cm) | Electrical conductivity at 125° C. after 1,000 hours (mS/cm) | Electrical conductivity retention rate (%) |
|---|---|---|---|---|---|---|---|
| Example | 1 | 0.83 | 19.8 | 520 | 0.83 | 0.46 | 56 |
| | 2 | 1.02 | 19.8 | 510 | 1.02 | 0.59 | 58 |
| | 3 | 1.43 | 19.8 | 500 | 1.43 | 0.77 | 54 |
| | 4 | 1.62 | 19.8 | 490 | 1.62 | 0.86 | 53 |
| | 5 | 1.85 | 19.8 | 470 | 1.85 | 1.02 | 55 |
| | 6 | 2.5 | 19.8 | 450 | 2.5 | 1.38 | 55 |
| | 7 | 1.5 | 12.7 | 500 | 1.5 | 0.80 | 53 |
| | 8 | 1.35 | 19.8 | 500 | 1.35 | 0.88 | 65 |
| | 9 | 1.65 | 19.8 | 480 | 1.65 | 0.89 | 54 |
| | 10 | 1.25 | 19.8 | 510 | 1.25 | 0.76 | 61 |
| | 11 | 1.2 | 25.6 | 510 | 1.2 | 0.66 | 55 |
| | 12 | 1.32 | 15.5 | 520 | 1.32 | 0.70 | 53 |
| | 13 | 1.1 | 24 | 520 | 1.1 | 0.62 | 56 |
| | 14 | 1.43 | 19.8 | 510 | 0.85 | 0.77 | 90 |
| | 15 | 1.43 | 19.8 | 450 | 2.1 | 2.02 | 96 |
| | 16 | 0.83 | 19.8 | 500 | 1.55 | 0.95 | 62 |
| | 17 | 0.83 | 19.8 | 510 | 1.34 | 0.80 | 60 |
| | 18 | 0.83 | 19.8 | 510 | 1.43 | 0.87 | 61 |
| Comparative Example | 1 | — | — | 440 | 1.87 | 0.80 | 43 |
| | 2 | 0.2 | 24.8 | 430 | 0.2 | 0.12 | 60 |
| | 3 | 0.4 | 24.8 | 420 | 0.4 | 0.12 | 53 |
| | 4 | 0.1 | 23.8 | 440 | 0.1 | 0.12 | 58 |
| | 5 | 0.8 | 33.7 | 410 | 0.8 | 0.22 | 28 |
| | 6 | insoluble | 5.7 | — | insoluble | — | — |

<Voltage Resistance>

A 10 cm² chemical etching aluminum foil for a high pressure was used as an anode, a 10 cm² plain aluminum foil was used as a cathode, each electrolytic solution for an electrolytic capacitor was used as an electrolytic solution, a load was applied at 25° C. according to a constant current method (2 mA) using a constant voltage and constant current DC power supply device [GP0650-05R, commercially available from Takasago Ltd.], and a voltage was measured. With a horizontal axis representing time, a voltage was plotted on a vertical axis. A rising curve of the voltage with the elapse of time was observed. A voltage when a disturbance in the rising curve due to sparking or scintillation first occurred was set as a sparking voltage. A higher sparking voltage indicated a higher voltage resistance.

<Electrical Conductivity and Heat Resistance>

(1) Measurement of Initial Electrical Conductivity

The electrical conductivity of the electrolytic solutions for an electrolytic capacitor at 30° C. was measured using a Conductivity Meter CM-40S [commercially available from DKK-TOA Corporation], and set as an initial electrical conductivity. A higher initial electrical conductivity indicated better electrical conductivity.

(2) Measurement of Electrical Conductivity at 125° C. After 1,000 Hours

The electrolytic solutions for an electrolytic capacitor were filled in a sealed container and left in a constant temperature dryer at 125° C. for 1,000 hours. Next, the electrical conductivity of the electrolytic solution after being left was measured in the same method as in (1) and set as an electrical conductivity at 125° C. after 1,000 hours.

(3) Evaluation of Electrical Conductivity Retention Rate

An electrical conductivity retention rate was obtained from the following formula and evaluated. A higher electrical conductivity retention rate indicated better heat resistance. Electrical conductivity retention rate (%)=electrical conductivity after 1,000 hours at 125° C./initial electrical conductivity×100

All of the electrolytic solutions for an electrolytic capacitor of Examples 1 to 18 had a high voltage resistance, high electrical conductivity, and excellent heat resistance.

On the other hand, the electrolytic solutions for an electrolytic capacitor of Comparative Examples 1 to 5 had inferior performance regarding at least one of the voltage resistance, electrical conductivity and heat resistance. The electrolytic solution for an electrolytic capacitor of Comparative Example 6 was not dissolved in the solvent and could not be evaluated.

This is thought to be caused by the fact that deterioration in the performance of the conventional electrolytic solution for an electrolytic capacitor is caused by esterification, amidation, and the like of anions and cations constituting an electrolyte, and when the surroundings of carbon atoms to which a carboxylate anion group of the electrolyte of the present invention is bonded have a three-dimensionally complicated structure, esterification, amidation, and the like which cause the performance deterioration can be reduced.

INDUSTRIAL APPLICABILITY

The electrolytic capacitor using the electrolytic solution for an electrolytic capacitor of the present invention can be suitably used as a capacitor for industrial devices because it has high voltage resistance and heat resistance.

The invention claimed is:

1. An electrolytic solution for an electrolytic capacitor comprising an electrolyte and a solvent, in which the electrolyte contains an anion and a cation, and the anion is an anion having a structure obtained by removing at least one hydrogen ion from a carboxy group from a copolymer having a carboxy group,
   wherein the copolymer having a carboxy group has a substituent having 5 or more and 20 or fewer carbon atoms bonded to a carbon atom of a backbone of the copolymer,
   the copolymer having a carboxy group does not include a hydroxy group or if it does include a hydroxy group, the content of monomers including a hydroxy group in the structural monomers of the copolymer having a carboxy group is less than 60 wt % based on the weight of all monomers constituting the copolymer having a carboxy group, and the copolymer satisfies the following Condition 1, and
   the solvent is a mixed solvent consisting of water and ethylene glycol: (Condition 1)
   the electrical conductivity of an ethylene glycol solution containing 10 wt % of an ammonium salt of the copolymer having a carboxy group and ammonia at 30° C. is 0.2 mS/cm or more and 3.0 mS/cm or less.

2. The electrolytic solution for an electrolytic capacitor according to claim 1,
   wherein, in the copolymer having a carboxy group, the content of oxygen atoms in the substituent having 5 or more and 20 or fewer carbon atoms is 33 mmol/g or less based on the weight of the substituent having 5 or more and 20 or fewer carbon atoms.

3. The electrolytic solution for an electrolytic capacitor according to claim 1,
   wherein the the copolymer comprises (meth)acrylic acid ester monomer units.

4. The electrolytic solution for an electrolytic capacitor according to claim 1,
   wherein a number average molecular weight of the copolymer having a carboxy group is 300 to 100,000.

5. The electrolytic solution for an electrolytic capacitor according to claim 1,
   wherein the cation is ammonium and/or amidinium.

6. The electrolytic solution for an electrolytic capacitor according to claim 3,
   wherein the (meth)acrylic acid ester monomer unit is at least one monomer selected from the group consisting of (meth)acrylic acid alkyl ester, (meth)acrylic acid hydroxyalkyl ester, alkylene oxide adducts of (meth)acrylic acid, and alkyl ethers of alkylene oxide adducts of (meth)acrylic acid.

7. The electrolytic solution for an electrolytic capacitor according to claim 1,
   wherein a glass transition temperature of the copolymer having a carboxy group is −100 to 100° C.

8. The electrolytic solution for an electrolytic capacitor according to claim 1, further comprising
   at least one selected from the group consisting of boric acid, borate ester, boronic acid, and boronic acid ester.

9. An electrolytic capacitor comprising the electrolytic solution for an electrolytic capacitor according to claim 1.

* * * * *